United States Patent [19]

Kumagai

[11] Patent Number: 5,384,866
[45] Date of Patent: Jan. 24, 1995

[54] THINNING METHOD OF AN IMAGE

[75] Inventor: Ryohei Kumagai, Tokyo, Japan

[73] Assignee: Ezel, Inc., Tokyo, Japan

[21] Appl. No.: 42,001

[22] Filed: Apr. 2, 1993

[30] Foreign Application Priority Data

Apr. 2, 1992 [JP] Japan ................................. 4-109295

[51] Int. Cl.⁶ .............................................. G06K 9/44
[52] U.S. Cl. ........................................ 382/55; 382/27
[58] Field of Search ..................... 382/55, 27, 41, 44

[56] References Cited

U.S. PATENT DOCUMENTS

| | | | |
|---|---|---|---|
| 4,034,344 | 7/1977 | Saraga et al. | 382/55 |
| 4,204,232 | 5/1980 | Mizume | 358/260 |
| 4,539,704 | 9/1985 | Pastor | 382/55 |
| 4,574,357 | 3/1986 | Pastor et al. | 382/55 |
| 4,665,441 | 5/1987 | Sakaue et al. | 382/55 |
| 4,703,363 | 10/1987 | Kitamura | 382/55 |
| 4,783,840 | 11/1988 | Song | 382/55 |
| 4,949,390 | 8/1990 | Iverson et al. | 382/55 |
| 5,018,211 | 5/1991 | Jaffe et al. | 382/55 |
| 5,034,992 | 7/1991 | Kumagai | 382/55 |
| 5,103,484 | 4/1992 | Stafford et al. | 382/55 |
| 5,142,589 | 8/1992 | Lougheed et al. | 382/55 |

FOREIGN PATENT DOCUMENTS 0375806  7/1990  European Pat. Off. .

OTHER PUBLICATIONS

Holt et al., "An Improved Parallel Thinning Algorithm", Communications of the ACM, Feb. 1987, vol. 30, No. 2, pp. 156–160.
Raju et al., "Study of Parallel Thinning Algorithms", IEEE International Conference, Oct. 1991, vol. 1, pp. 661–666.
Chin et al., "A One-Pass Thinning . . . ", Computer Vision . . . , vol. 40, No. 1, Oct. 1987, pp. 30–40.
Naccache et al., "An Investigation . . . Hilditch", Patern Recognition, vol. 17, No. 3, 1984, pp. 279–284.
Paul C. K. Kowk, A Thinning Algorithm By Contour Generation, Communications of ACM Nov. 1988, vol. 31, No. 11, pp. 1314–1324.
E. S. Deutsch, Thinning Algorithms On Rectangular, Hexagonal, and Triangular Arrays, Communications of the ACM, Scientific Application, Sep. 1972, vol. 15, No. 9.

*Primary Examiner*—Joseph Mancuso
*Attorney, Agent, or Firm*—Cushman, Darby & Cushman

[57] ABSTRACT

An image thinning method for obtaining a resultant image of one pixel width without removing the object being thinned when the object changes width from 3 pixels to 2 pixels. An index pixel value is defined to be a value that is not used in the image. The object is scanned so that each pixel is examined sequentially. The pixel value of the pixel being examined is changed according to the defined rules so as to create a thinned image with a width of one pixel.

1 Claim, 2 Drawing Sheets

FIG. 1

BEFORE THINNING

FIG. 2

AFTER THINNING

THINNING METHOD OF AN IMAGE

BACKGROUND OF THE INVENTION

1. Field of the Invention

The present invention relates to an image processing method in which the lines are thinned. A predetermined background pixel value is first assigned to boundary pixels. Pixels are then analyzed sequentially and are assigned a background pixel value based on the results of previous analysis. A pixel configuration is thus transformed into a thinned configuration in which the characteristics of the original are preserved.

2. Description of the Related Art

In some images, such as the microscopic image of a crystalline structure, a boundary of the surface of the object being imaged comes out as a line with a width of more than one pixel. It is impossible to measure the object without transforming this line into a line with a width of one pixel. It is thus necessary to transform the boundary into a line with a one pixel width by thinning. However, it is impossible to measure an object accurately when the boundary line is discontinuous and when adjacent objects are fused to each other during thinning. Therefore, in order to prevent incorrect measurements, the following constraints must be met:

1) the width of the thinned line must be 1;
2) the position of the line must be substantially in the center of the original object;
3) continuity of the object must be preserved;
4) the end part of the thinned line must not be contracted;
5) a spike-like line must not be generated by unevenness in the thinned line; and
6) the thinned line must not be deformed at the intersection of objects.

Items 1) to 4) are called the basic conditions of thinning, and they must be satisfied first in any thinning algorithm. See Hasegawa, Junichi: *Image Processing on Personal Computer*, Published by Gijutsuhyoronsha, p. 66–67, 1986.

A conventionally known and highly evaluated thinning method is Hilditch's method. The processing speed of Hilditch's method is insufficient, however, because the method counts the number of connectedness of the pixels in the object and of the background pixels. To solve the above problem, a method disclosed in Japanese Patent Publication Number SHO 64-13680 is known. However, this method completely loses objects when a line which changes width from 3 pixels to 2 pixels (See FIG. 1) is processed.

SUMMARY OF THE INVENTION

This invention is invented to solve these conventional problems and provides a high speed image processing method which generates a good thinning result.

The image thinning method according to the present invention prevents a spike from being left in the thinned line. An index pixel value is determined when there is a possibility of generating a line which changes its width from 3 pixels to 2 pixels. When it is determined that the line changes its width from 3 pixels to 2 pixels, one of the pixels in the line is given the index pixel value and the pixel value of the pixel on the lower right, relative to the pixel with the index pixel value, is preserved. On the next scan, the pixel with the index pixel value is given the background pixel value.

According to the thinning method of this invention, it is possible to thin a line into a width of one pixel at high speed without removing the line, even where the line changes its width from 3 to 2 along the scan line.

BRIEF DESCRIPTION OF THE DRAWINGS

FIG. 1 shows an image that is to be thinned.

FIG. 2 shows the image of FIG. 1 after thinning has been performed.

PREFERRED EMBODIMENT OF THE PRESENT INVENTION

An embodiment of an image thinning method according to the present invention is explained below with reference to the attached drawings.

In this embodiment pixels are scanned row by row from the left to the right starting from the top row. The value of a pixel which is not part of the boundary line that is being thinned is determined beforehand to be the background pixel value (for example, "0").

An index pixel value is defined to be some pixel value that does not exist in the image (for example, "−1"). The image is then scanned as described above. During scanning each pixel is analyzed sequentially. The pixel currently being analyzed is known as the objective pixel (shown as pixel A in FIGS. 3–8). As scanning proceeds, the pixel value of the objective pixel is changed to a background pixel value if the objective pixel has an index pixel value and if it is connected to one non-background, non-index pixel. When the objective pixel does not have either the background pixel value or the index pixel value but is connected to only one non-background, non-index pixel, then the pixel value of the objective pixel will be modified according to the following rules.

Figure 3:
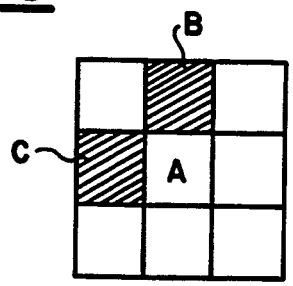
FIG. 3 shows a 3×3 pixel section of an object which section has a certain pixel arrangement known as condition [1].

[1] When prior to scanning the pixel B above the objective pixel A and the pixel C on the left of the objective pixel A have a background pixel value or an index pixel value, as shown in FIG. 3, the objective pixel A is given an index pixel value.

Figure 4:
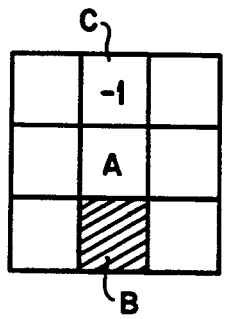
FIG. 4 shows a 3×3 pixel section of an object which section has a certain pixel arrangement known as condition [2].

[2] When condition [1] is not met and when, as is shown in FIG. 4, the pixel C above the objective pixel A has an index pixel value and the pixel B beneath the objective pixel A has a background pixel value, the pixel value of objective pixel A is left unchanged.

Figure 5:
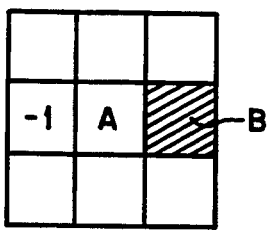
FIG. 5 shows a 3×3 pixel section of an object which section has a certain pixel arrangement known as condition [3].

[3] When condition [1] is not met and when, as is shown in FIG. 5, the pixel on the left of objective pixel A has an index pixel value and the pixel B on the right of objective pixel A has a background pixel value, the pixel value of objective pixel A is left unchanged.

Figure 6:
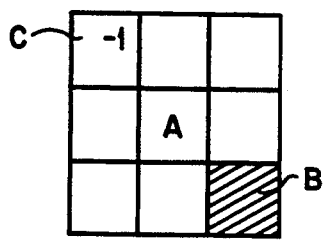
FIG. 6 shows a 3×3 pixel section of an object which section has a certain pixel arrangement known as condition [4].

[4] When condition [1] is not met and when, as is shown in FIG. 6, the pixel C on the upper left of objective pixel A has an index pixel value and the pixel B on the lower right of objective pixel A has a background pixel value, the pixel value of objective pixel A is left unchanged.

Figure 7:
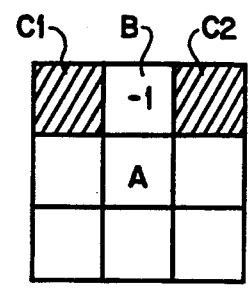
FIG. 7 shows a 3×3 pixel section of an object which section has a certain pixel arrangement known as condition [5].

[5] When conditions [1]–[4] are not met and when, as is shown in FIG. 7, the pixel B above the objective pixel A has an index pixel value and when the pixels C1 and C2 on the left and the right of the pixel B have background pixel values, the pixel value of objective pixel A is left unchanged.

Figure 8:
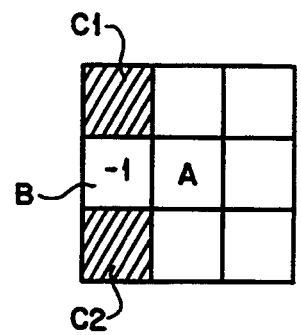
FIG. 8 shows a 3×3 pixel section of an object which section has a certain pixel arrangement known as condition [6].

[6] When conditions [1]–[4] are not met and when, as shown in FIG. 8, pixel B on the left of pixel A has an index pixel value, and when pixel C1 above pixel B and pixel C2 beneath pixel B have background pixel values, objective pixel A is given an index pixel value.

[7] When conditions [1]–[6] are not met, the objective pixel A is given a background pixel value.

When the value of a pixel prior to scanning is evaluated, this means that the surrounding pixels are treated as having the values that they had prior to scanning (i.e., any changes made during scanning will be ignored). On the other hand, when pixels are analyzed sequentially during scanning, then the analysis will take into account any change of pixel values that was made up to that point. When a pixel is given an index pixel value is analyzed sequentially on the next scan, that pixel will be treated as having an index pixel value (i.e., it will be given the background pixel value).

Figures 1, 2:
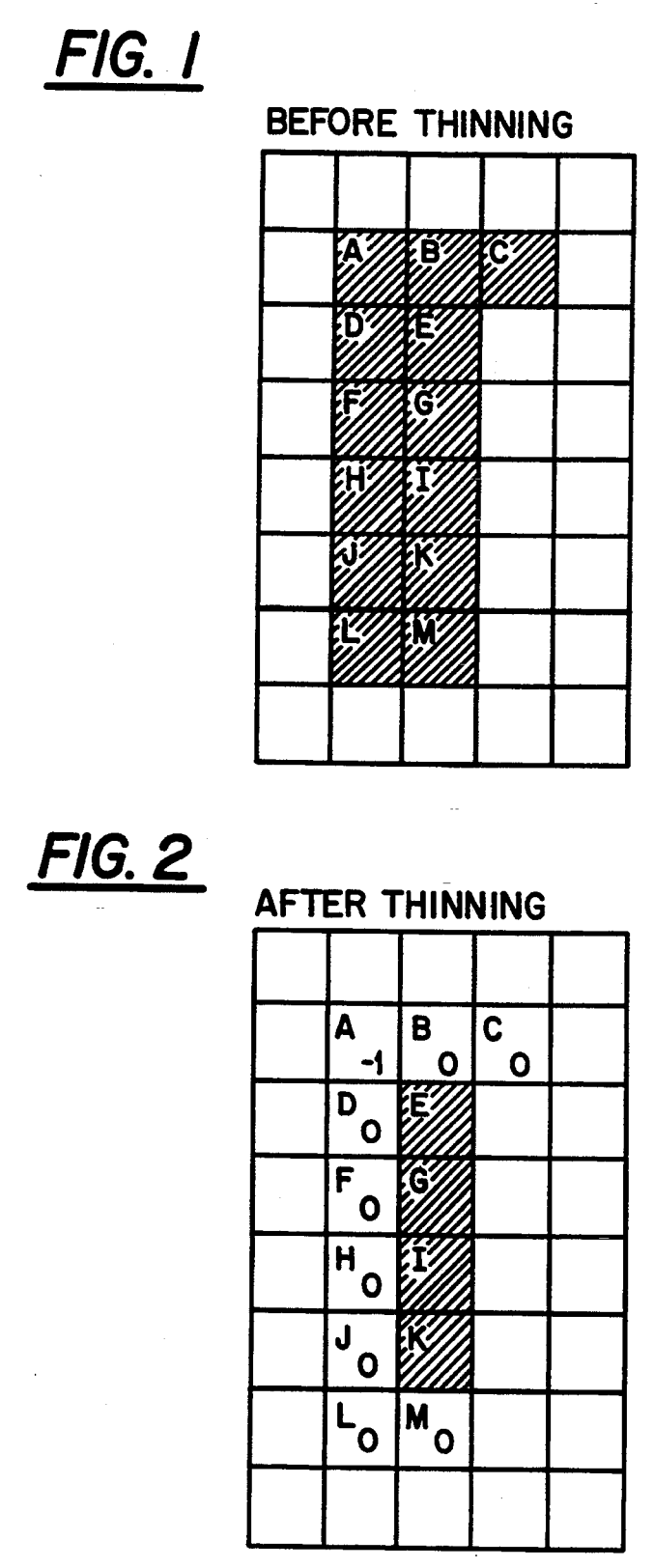

Following is a description of how the method of this invention is performed on an object having a width that changes from 3 pixels to 2 pixels, which object is shown in FIG. 1. Pixel A in FIG. 1 is the first pixel analyzed during scanning. Pixel A satisfies condition [1], and thus it is given an index pixel value (see FIG. 2). Pixels B, C, and D do not satisfy conditions [1]–[6], and thus they are given background pixel values according to condition [7]. Pixel E satisfies condition [4] and is preserved as it is. Pixel F does not satisfy conditions [1]–[6] and is given the background pixel value. Because pixel F has changed its value to the background pixel value, pixel G has 2-connectedness in sequential processing and is preserved as it is. Pixel H does not satisfy conditions [1]–[6] and is given the background pixel value. Because pixel H has been given the background pixel value, pixel I has 2-connectedness and is preserved as it is. Pixel J does not satisfy conditions [1]–[6] and is given the background pixel value. Because pixel J has a background pixel value, pixel K has 2-connectedness and is preserved as it is. Pixels L and M do not satisfy conditions [1]–[6] and are given the background pixel value. As a result of this thinning processing, the object shown in FIG. 1 is thinned so as to become the object shown in FIG. 2.

According to the invention described above, an object having a boundary line whose width parallel to the scan line changes from 3 pixels to 2 pixels can quickly be thinned into a line of one pixel width without removing the line.

It is claimed:
1. A method of thinning a configuration in an image, which method comprises the steps of:
successively examining pixels along successive scan lines, wherein an initial value for each pixel in said image is that value which said pixel had at the start of execution of said thinning method, wherein a background pixel value is the value which pixels have that are in said image but not on the boundary of said configuration, wherein an index pixel value is a value assigned to a pixel and which is different from any said initial value, wherein the current scan line is a scan line which contains said pixel being examined, wherein the previous scan line is a scan line that is scanned immediately previous to said current scan line, wherein the following scan line is a scan line that is scanned immediately following said current scan line; and
changing the value of said pixel being examined according to the following when the initial value of at least two of the pixels adjacent to the pixel being examined were said background pixel value and when the pixel being examined has a number of connectedness equal to one:
a) when said pixel being examined has said index pixel value, the value of said pixel being examined is changed to said background pixel value;
b) when said pixel being examined has neither said index pixel value nor said background pixel value, the value of said pixel being examined is changed as follows:
 i) the value of said pixel being examined is changed to said index pixel value when the condition occurs such that both (1) the initial value of a pixel immediately preceding said pixel being examined in said current scan line was said background pixel value or said index pixel value, and (2) the initial value of a pixel on said previous scan line which pixel has a position corresponding to said pixel being examined was said background pixel value or said index pixel value;
 ii) if the condition specified in step (i) is not met, then the value of said pixel being examined is not changed when the condition occurs such that both (1) a pixel on said previous scan line which pixel has a position corresponding to said pixel being examined has said index pixel value, and (2) a pixel on said following scan line which pixel has a position corresponding to said pixel being examined has said background pixel value;
 iii) if the condition specified in step (i) is not met, then the value of said pixel being examined is not changed when the condition occurs such that both (1) a pixel which immediately precedes said pixel being examined in said current scan line has said index pixel value, and (2) a pixel which immediately follows said pixel being examined in said current scan line has said background pixel value;
 iv) if the condition specified in step (i) is not met, the value of said pixel being examined is not changed when the condition occurs such that both (1) a pixel on said previous scan line which pixel has a position along said scan line immediately preceding a pixel corresponding to the pixel being examined has said index pixel value; and (2) a pixel on said following scan line which pixel has a position along said scan line immediately following a pixel corresponding to the pixel being examined has said background pixel value;
 v) if none of the conditions specified in steps (i), (ii), (iii) or (iv) are met, then the value of said pixel being examined is changed to said index pixel value when the condition occurs such that both (1) a pixel on said previous scan line which pixel has the position corresponding to said pixel being examined has said index pixel value, and (2) the value of a pixel which immediately precedes the pixel being examined in said current scan line and the value of a pixel which immediately follows the pixel being examined in said current scan line are said background pixel value;

vi) if none of the conditions specified in steps (i), (ii), (iii) or (iv) are met, the value of said pixel being examined is changed to said index pixel value when the condition occurs such that both (1) a pixel on said current scan line which immediately precedes the pixel being examined has said index pixel value, and (2) the value of a pixel on said previous scan line which pixel has the position immediately preceding a pixel corresponding to said pixel being examined in said previous scan line and the value of a pixel on said following scan line which pixel has the position immediately preceding a pixel corresponding to said pixel being examined in said following scan line are said background pixel values; and vii) the value of the pixel being examined is changed to said background pixel value when none of the conditions specified in steps (i), (ii), (iii), (iv), (v), or (vi) are met.

* * * * *